United States Patent

[11] 3,612,668

[72] Inventor Willis T. Watkins
Hickman Mills, Mo.
[21] Appl. No. 34,245
[22] Filed May 4, 1970
[45] Patented Oct. 12, 1971
[73] Assignee Parmelee Industries, Inc.

[54] ADJUSTABLE TEMPLE FOR SPECTACLES
7 Claims, 6 Drawing Figs.

[52] U.S. Cl. .................................................. 351/118,
287/58 CT, 351/140
[51] Int. Cl. ..................................................... G02c 5/20
[50] Field of Search .......................................... 351/118,
111, 140, 121, 113, 123; 287/58 CT

[56] References Cited
UNITED STATES PATENTS
2,797,617 7/1957 Ring .............................. 351/118
3,510,208 5/1970 Watkins ........................ 351/118

FOREIGN PATENTS
1,358,532 3/1964 France ......................... 351/118

Primary Examiner—David Schonberg
Assistant Examiner—John W. Leonard
Attorney—Schmidt, Johnson, Hovey and Williams ABSTRACT: An extensible temple for spectacles utilizes a pair of relatively movable front and rear temple sections. The front temple section receives a body of resilient material which presents an elastic mass through which an elongated connecting rod secured to the rear temple section passes. As the elongated connecting rod extends through the elastic mass it causes expansion of the surrounding material to an extent to hold the rod and the body in sufficiently tight interengagement to interlock the temple sections, except during adjustment of the temple when force is applied to shift the rod within the elastic mass.

PATENTED OCT 12 1971 3,612,668

INVENTOR.
Willis T. Watkins
BY
Schmidt, Johnson, Hovey,
Williams & Chase
ATTORNEYS.

ADJUSTABLE TEMPLE FOR SPECTACLES

This invention relates to an improved temple section for all types of eyeglasses.

Increased emphasis on eye safety has resulted in greater use of eyeglasses, not only for vision correction, but also for eye protection. Particularly in industrial usage, it is important that safety glasses have adjustable temples to permit an industrial plant to maintain a stock of glasses of only one size and thereby avoid the expense of an inventory of various sizes. In certain instances it is also desirable to have glasses which are adjustable to accommodate wearing by more than one person. A significant advance in spectacle construction is represented by the allowed U.S. application Ser. No. 761,990, now U.S. Pat. No. 3,510,208, entitled "Adjustable Temples For Spectacles" of which the present applicant is the inventor.

It is an important object of the present invention to provide an extensible and infinitely adjustable temple for spectacles which do not require disengagement of any fasteners prior to changing the length of the temple.

Another object of the invention is to provide an adjustable temple for spectacles wherein a pair of front and rear temple sections are held in firm gripping engagement when in any one of an infinite number of positions.

An equally important object of the present invention is to provide an adjustable temple for spectacles which utilizes a body of pierceable, resilient material to interlock a pair of front and rear temple sections.

It is also an object of the present invention to provide an extensible temple as described in the foregoing object wherein the body of resilient material eliminates all critical tolerances between the relatively movable temple sections.

Still another object of the invention is to provide an adjustable temple for spectacles wherein the need for access openings to the interior of the temple is eliminated, thus avoiding the possibility of dirt entering the temple and interfering with the relatively movable components.

The invention contemplates a pair of elongated front and rear temple sections which are locked in interengagement by a connecting rod extending through a body of resilient material. As the connecting rod passes through the resilient material it causes expansion of the surrounding material to an extent to hold the rod and the body in tight interengagement thereby interlocking the sections, except during adjustment of the length of the temple when force is applied to shift the rod within the resilient material.

Figure 1:
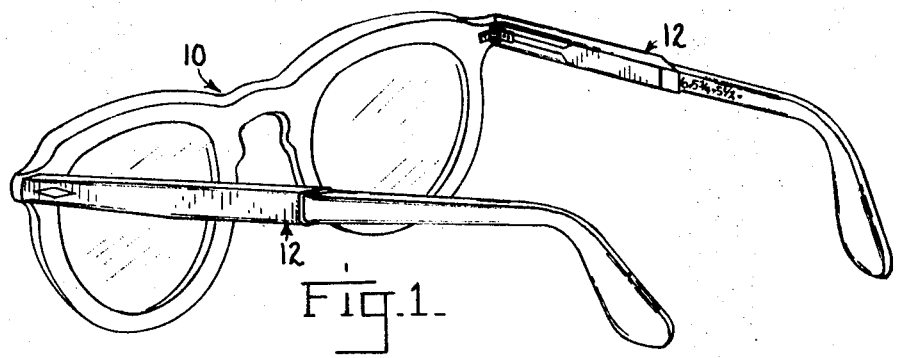
FIG. 1 is a perspective view of a pair of spectacles utilizing a pair of adjustable temples.

A pair of conventional spectacles are designated by the numeral 10 in FIG. 1 and these spectacles utilize a pair of adjustable temples 12 which are secured to the spectacle frame in a conventional manner. Since both of the temples 12 are identical, the following description will be limited to only one of the same.

Figure 2:
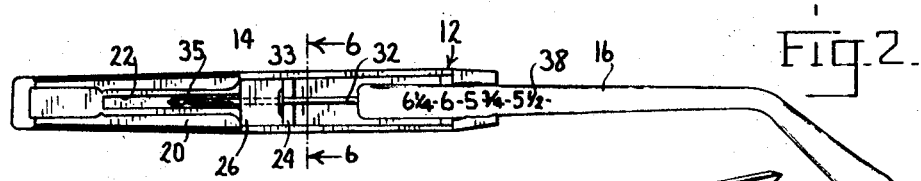
FIG. 2 is a side elevational view of one of the adjustable temples with its closure panel being removed for purposes of illustration.
Figure 3:
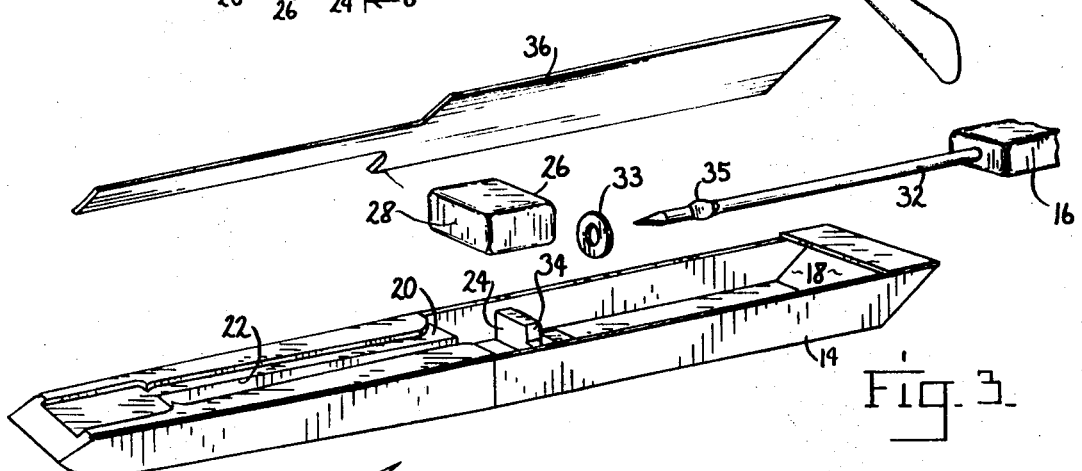
FIG. 3 is an exploded perspective view of the temple section of FIG. 2.

Referring to FIGS. 2 and 3, it is seen that each of the temples 12 includes an elongated front temple section 14 which telescopically receives an elongated rear temple section 16. The front temple section 14 has a hollow interior and is of generally U-shaped cross section over approximately one-half of its length to permit it to telescopically receive the rear temple section 16. One end of the front temple section 14 presents an opening 18 for insertion of the rear temple section 16. The left-hand one-half of the temple section 14, when viewed in FIGS. 2 and 3, is constructed with an integral solid reinforcing insert 20 which has a slot 22 extending longitudinally thereof and being centrally disposed for purposes to be made clear hereinafter. A vertical wall 24 spans the distance between the sidewalls of the hollow, U-shaped portion of the temple section 14 and cooperates with the sidewalls, as well as with the terminal edge of the insert 20 to define a pocket within the section 14.

Figure 4:
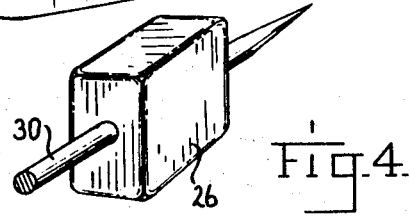
FIG. 4 is a perspective view of the body of resilient material which interlocks the front and rear temple sections illustrating the manner in which the material is pierced to present a pilot passage therethrough.

A body 26 of resilient material which can be any one of a number of thermoplastic or rubber-based components, suitably described as elastomeric, and is preferably a vinyl plastic, presents an elastic mass having a slightly larger horizontal cross-sectional area than the corresponding cross-sectional area of the pocket within the temple section 14. The body 26 has preferably been pierced to present a pilot passage 28 therethrough. This is accomplished in the manner illustrated in FIG. 4 by inserting a piercing rod 30 into the body 26 and then withdrawing the same. Since none of the material is actually removed during the piercing operation, the resilient material closes in around the pilot passage 28 upon removal of the rod 30, this being desirable for purposes to be made clear hereinafter.

The rear temple section 16 has an elongated connecting rod 32 secured thereto which extends longitudinally thereof in the direction of the front temple section 14. A retainer washer 33 is telescopically received on the rod 32 and a flattened portion 35 of the rod forms a stop for precluding disengagement of the washer and the rod. The vertical wall 24 presents a guide channel 34 which directs the connecting rod 32 into the pilot passage 28 when the section 16 is telescopically received by the section 14. As the connecting rod 32 passes through the body 26 it is received by the slot 22. A closure panel 37 is secured to the temple section 12, preferably by ultrasonic welding, to seal the entire assembly within the section 14.

The rear temple section 16 is provided with a plurality of numbers 38 thereon which are visible to the wearer as the rear temple section 16 is shifted with respect to the front section 14 to adjust the length of the temple 12. When the connecting rod 32 is disposed within the pilot passage 28 it causes expansion of the surrounding material of the body 26 to an extent to hold the rod and the body in sufficiently tight interengagement to interlock the sections 14 and 16, except during adjustment of the length of the temple when force is applied to shift the rod 32 within the elastic mass presented by the body 26. The fact that the body 26 is of slightly larger cross-sectional area than the corresponding area of the pocket within the section 14 causes a slight compression of the body as it is inserted within the pocket. This facilitates retention of the body 26 within the pocket and also causes further restriction of the pilot passage 28 to assure tight interengagement of the resilient material with the connecting rod 32.

Figure 6:
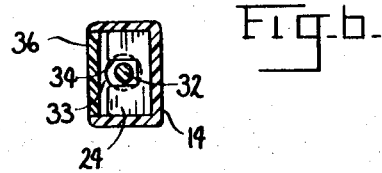
FIG. 6 is a cross-sectional view taken along line 6—6 of FIG. 2.
Figure 5:
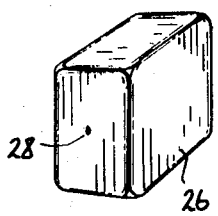
FIG. 5 is a perspective view similar to FIG. 4 after the piercing rod has been removed from the material.

Assembly of the front and rear temple sections includes telescoping the washer 33 onto the rod 32 after which the rod is crimped to present flattened portion 35. The body 26 is compressed into the pocket of the section 14, after the pilot passage 28 has been formed therein, and the rod 32 is inserted through the opening 18 and into the body 26. After the rod 32 has passed through the body 26, a downward force is applied to the section 16 to lift the body out of its pocket. This allows the washer 33 to be moved along the rod 32 to a position where subsequent reinsertion of the body 26 into the pocket of section 14 sandwiches the washer between the body and the wall 24 as illustrated in FIGS 2 and 6. This precludes removal of the rod 32 from the body 26 as the two sections 14 and 16 are moved relatively.

A particular advantage of the temple construction herein described is the elimination of any need to disengage or loosen the fastening means which interlock the two relatively movable temple sections, thus making adjustment possible by simply applying a force in the direction in which it is desired to move the rear temple section 16. It will also be appreciated that the body 26 of resilient material which interlocks the front and rear sections 14 and 16, eliminates the critical tolerances normally required between moving parts. While the pilot passage 28 is preferably constructed with a rod 30 of the same diameter as connecting rod 32, a somewhat smaller or larger piercing rod can be utilized. It is also contemplated that in some instances formation of the pilot passage 28 will be eliminated and the initial piercing of the body 26 will be done by the connecting rod 32. As best illustrated in FIG. 6, the sealed construction of the temple 12 not only facilitates retention of the body 26 within the aforementioned pocket, but also precludes entrance of contaminants into the hollow interior of the section 14, which could interfere with the movement of the connecting rod 32 within the pilot passage 28.

Having thus described the invention, what is claimed as new and desired to be secured by Letters Patent is:

1. An adjustable temple for spectacles comprising: a pair of elongated, front and rear temple sections, telescopically received one within the other for movement along their longitudinal axes said rear section being longitudinally shiftable with
respect to said front section to permit selective positioning of the rear section to adjust the length of the temple;
a body of resilient elastomeric material carried by one of said sections said front temple section including pocket-defining means for receiving said elastomeric body, aid pocket and the body having relative dimensions to cause the body to be firmly retained in the sprocket; and
an elongated connecting rod secured to the other of said sections and extending longitudinally thereof, said rod extending through said elastomeric body and causing expansion of the surrounding material to an extent to hold the rod and the body in sufficiently tight interengagement to frictionally interlock the sections, except during adjustment of the length of the temple when sufficient force is applied to shift the rod within the elastomeric body.

2. Apparatus as set forth in claim 1, said body being pierced to define a pilot passage into which said rod is inserted.

3. Apparatus as set forth in claim 1, wherein said pocket has a sufficiently smaller cross-sectional area than the cross-sectional area of said body to cause the latter to be compressed when it is inserted within the pocket.

4. Apparatus as set forth in claim 3, wherein said pocket-defining means presents a guide channel for directing said connecting rod into said pilot passage.

5. Apparatus as set forth in claim 3, wherein one wall of said pocket is a closure panel disposed in covering relationship to said front temple section to facilitate retention of said body within said pocket.

6. Apparatus as set forth in claim 1, wherein said elastomeric body comprises a vinyl plastic.

7. Apparatus as set forth in claim 3, wherein is included a retainer washer telescopically received on said rod; stop means on said rod for precluding disengagement of said washer and said rod, said washer being sandwiched between said body and said pocket-defining means whereby removal of said rod from said body is precluded.